US012348569B2

(12) United States Patent
El-Azzami et al.

(10) Patent No.: US 12,348,569 B2
(45) Date of Patent: Jul. 1, 2025

(54) MANAGING POLICIES FOR DATA PROCESSING SYSTEMS USING OUT OF BAND COMMUNICATION CHANNELS

(71) Applicant: Dell Products L.P., Round Rock, TX (US)

(72) Inventors: Bassem El-Azzami, Austin, TX (US); Abeye Teshome, Austin, TX (US); Richard M. Tonry, Georgetown, TX (US); Mohit Arora, Frisco, TX (US); Adolfo Sandor Montero, Pflugerville, TX (US); Vinodkumar Vasudev Ottar, Mckinney, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 18/498,266

(22) Filed: Oct. 31, 2023

(65) Prior Publication Data

US 2025/0141928 A1    May 1, 2025

(51) Int. Cl.
*H04L 9/40* (2022.01)
(52) U.S. Cl.
CPC .................................. *H04L 63/20* (2013.01)
(58) Field of Classification Search
CPC ...................................................... H04L 63/20
USPC ............................................................ 726/1
See application file for complete search history.

(56) References Cited

U.S. PATENT DOCUMENTS

| 7,599,907 | B2 | 10/2009 | Havewala et al. |
| 8,020,192 | B2 | 9/2011 | Wright et al. |
| 8,490,163 | B1 | 7/2013 | Harsell et al. |
| 8,850,186 | B2 | 9/2014 | Yamauchi |
| 9,191,781 | B2 | 11/2015 | Kumar |
| 9,246,678 | B2 | 1/2016 | Nayshtut et al. |
| 9,349,009 | B2 | 5/2016 | Rivera |

(Continued)

OTHER PUBLICATIONS

Qayyum et al., "Awareness of Kill Switch Application Among Mobile Phone Users," 2019 UK/ China Emerging Technologies (UCET), Glasgow, UK, 2019, pp. 1-5, doi: 10.1109/UCET.2019. 8881876. (Year: 2019).*

(Continued)

*Primary Examiner* — Peter C Shaw
(74) *Attorney, Agent, or Firm* — WOMBLE BOND DICKINSON (US) LLP

(57) ABSTRACT

Methods and systems for managing policies for data processing systems are disclosed. A management controller for the data processing system may utilize an out of band communication channel to obtain a policy for the data processing system from a trusted management system if the data processing system is reported as lost or stolen by an owner of the data processing system. The management controller may identify a state of the data processing system as powered or unpowered. The management controller may then identify one or more actions specified by the policy and based on the state of the data processing system to be performed. By doing so, the management controller may discourage unintended use of the data processing system by a user other than the owner of the data processing system.

20 Claims, 5 Drawing Sheets

(56) References Cited

U.S. PATENT DOCUMENTS

| | | | |
|---|---|---|---|
| 9,392,021 B1* | 7/2016 | Labana | H04L 63/10 |
| 9,721,111 B2 | 8/2017 | Cavanaugh | |
| 9,721,175 B2 | 8/2017 | Kursun et al. | |
| 9,785,491 B2 | 10/2017 | Cilfone et al. | |
| 10,021,669 B2 | 7/2018 | George | |
| 10,163,105 B1 | 12/2018 | Ziraknejad et al. | |
| 10,169,571 B1 | 1/2019 | Attfield et al. | |
| 10,395,039 B2 | 8/2019 | Khatri et al. | |
| 10,630,489 B2 | 4/2020 | Hughes | |
| 10,678,555 B2 | 6/2020 | Johansson et al. | |
| 10,841,295 B1 | 11/2020 | Pecen et al. | |
| 10,887,276 B1 | 1/2021 | Parulkar | |
| 11,563,565 B2 | 1/2023 | Yang et al. | |
| 11,704,384 B2 | 7/2023 | Murphy et al. | |
| 2010/0019730 A1* | 1/2010 | Chueh | H02J 7/0031 320/135 |
| 2012/0032834 A1* | 2/2012 | Weeks | G01S 7/003 726/36 |
| 2013/0086262 A1 | 4/2013 | Bhadri | |
| 2017/0277876 A1 | 9/2017 | Alameh et al. | |
| 2017/0289197 A1 | 10/2017 | Mandyam et al. | |
| 2017/0364712 A1* | 12/2017 | Munafo | G06F 21/83 |
| 2018/0006829 A1 | 1/2018 | Kravitz et al. | |
| 2018/0191733 A1 | 7/2018 | Kundu | |
| 2018/0253569 A1* | 9/2018 | Swierk | G06F 21/554 |
| 2019/0095352 A1* | 3/2019 | Poornachandran | G06F 11/1068 |
| 2019/0156019 A1 | 5/2019 | Chen | |
| 2019/0173962 A1 | 6/2019 | Ben Ali | |
| 2022/0222328 A1 | 7/2022 | Talib et al. | |

OTHER PUBLICATIONS

Tu et al., "Understanding User's Behaviors in Coping with Security Threat of Mobile Devices Loss and Theft," 2012 45th Hawaii International Conference on System Sciences, Maui, HI, USA, 2012, pp. 1393-1402, doi: 10.1109/HICSS.2012.620. (Year: 2012).*

Pfitzmann et al., "Trusting mobile user devices and security modules," in Computer, vol. 30, No. 2, pp. 61-68, Feb. 1997, doi: 10.1109/2.566159. (Year: 1997).*

Ju et al., "Implementation of a hardware security chip for mobile devices," in IEEE Transactions on Consumer Electronics, vol. 61, No. 4, pp. 500-506, Nov. 2015, doi: 10.1109/TCE.2015.7389805. (Year: 2015).*

* cited by examiner

MANAGING POLICIES FOR DATA PROCESSING SYSTEMS USING OUT OF BAND COMMUNICATION CHANNELS

FIELD

Embodiments disclosed herein relate generally to managing data processing systems. More particularly, embodiments disclosed herein relate to systems and methods to manage policies for the data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
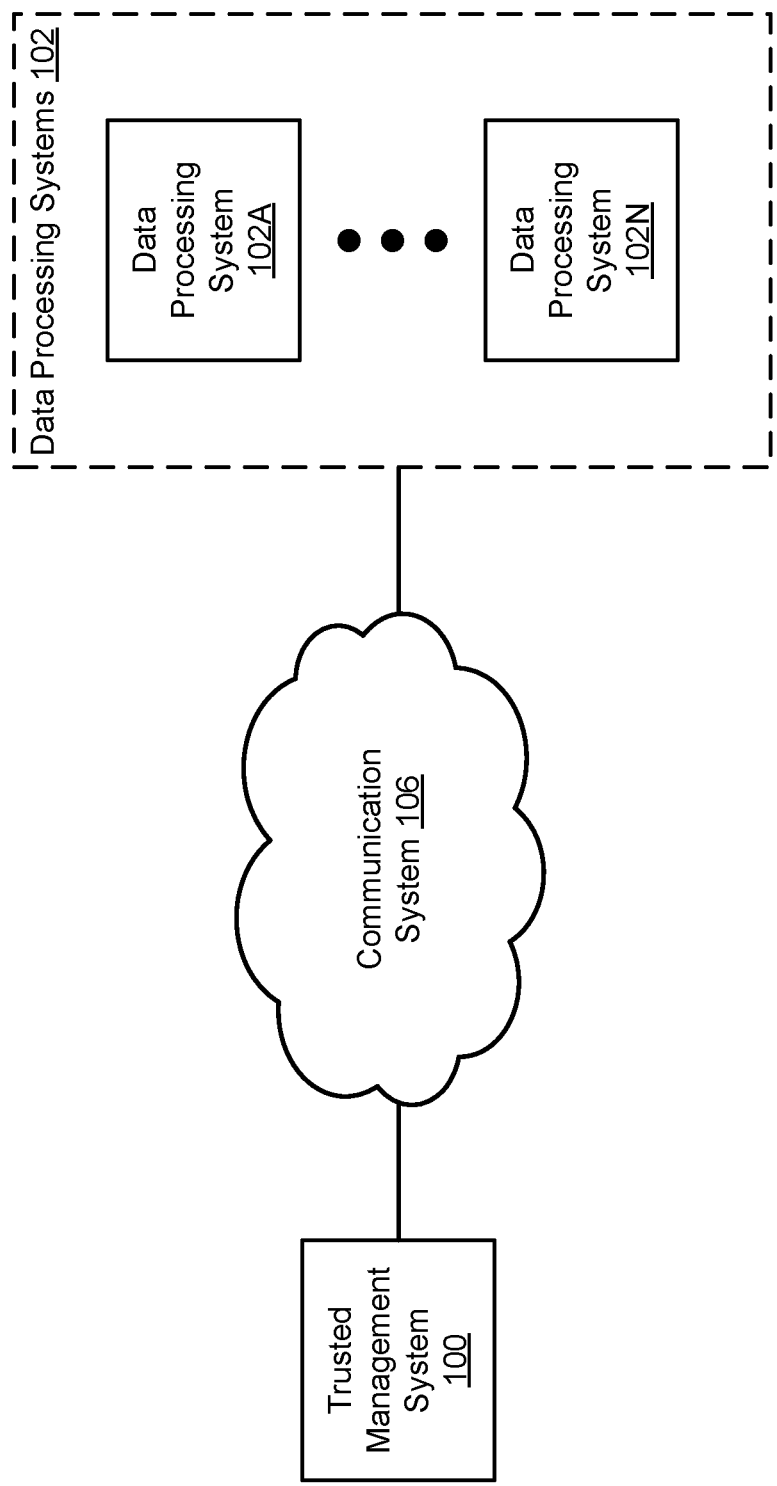
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

While providing, at least in part, the computer-implemented services, the data processing systems may become lost or may be stolen. A data processing system that is lost or stolen may be susceptible to intrusion (e.g., a physical attack on the data processing system) by a malicious entity and/or other unintended use of the data processing system. Unintended use of the data processing system may lead to loss and/or manipulation of data stored by the data processing system. In addition, computer-implemented services provided by the data processing system (e.g., to and/or by an owner of the data processing system) may become unavailable.

Policies may be used to determine actions responsive to loss or theft of the data processing system. A policy may specify, for example, that human interface devices (HIDs) are to be disabled if an intrusion is identified. For example, HIDs of the data processing system may include a keyboard, a mouse, a power button, etc. Disabling the HIDs may render the HIDs unresponsive to user input thereby thwarting the malicious entity's attempt to use the data processing system. Performance of the actions may rely on in band components (e.g., in band hardware components, in band communication channels) of the data processing system and software hosted by the in band components.

Specifically, at least a portion of the actions may be performed by an agent hosted by hardware resources of the data processing system. In order to initiate the actions, an entity (e.g., a trusted management system) may provide the policy via an in band communication channel to the data processing system. Doing so may indicate that the data processing system has been lost or stolen. The agent may subsequently perform actions (e.g., including intrusion detection and determining an appropriate responsive action) based on the policy to deter unintended use of the data processing system.

However, the malicious entity may circumvent performance of the actions through compromise of any of the in band components of the data processing system. For example, a malicious entity may disable the in band communication channel and may perform actions to remove software (e.g., the agent) responsible for interpreting and implementing policies. Therefore, upon reconnection of the in band communication channel, the data processing system may be incapable of interpreting and implementing policies obtained from the trusted management system.

To prevent unintended use of a data processing system without relying on in band components of the data processing system, embodiments disclosed herein relate to methods and systems for managing policies using an out of band communication channel. The trusted management system may provide a policy to a management controller of the data processing system reported as lost or stolen using the out of band communication channel. The policy may indicate actions to be performed by a management controller of the data processing system. The management controller and a network module that manages communication channels for the data processing system may be powered separately from hardware resources of the data processing system. Therefore, the management controller may communicate with the trusted management system via the out of band communication channel (e.g., a communication channel that may not be compromised by a malicious entity) to obtain a policy while the hardware resources of the data processing system are unpowered. Consequently, the management controller may implement the policy to discourage further malicious activity regardless of whether hardware resources of the data processing system are powered.

Specifically, the management controller may obtain the policy from the trusted management system via the out of band communication channel. The management controller may identify a state of the data processing system (e.g., whether the data processing system is powered or unpowered) and may identify a response from the policy based on the identified state and/or other information. For example, the management controller may perform a first action if the data processing system is powered upon receiving the policy and the management controller may perform a second action if the data processing system is unpowered upon receiving the policy. By doing so, actions may be taken to discourage unintended use of a lost or stolen data processing system by an entity that is not the owner of the data processing system.

In an embodiment, a method of managing data processing systems is provided. The method may include: obtaining, by a management controller of a data processing system of the data processing systems and via an out of band communication channel, a policy from a trusted management system; identifying, by the management controller, a state of the data processing system; selecting, by the management controller, one or more actions based on the policy and the state; and performing, by the management controller, the one or more actions to implement the policy.

The policy may be applicable to data processing systems that have been reported by owners of the data processing systems as being lost or stolen.

The state of the data processing system may be powered or unpowered.

While the state of the data processing system is unpowered, the management controller may be powered and other hardware resources of the data processing system may be unpowered.

While the state of the data processing system is powered, the management controller may be powered and the other hardware resources of the data processing system may be powered.

The policy may specify that while the state of the data processing system is unpowered and the policy is obtained, human interface devices of the data processing system are to be disabled after the data processing system is powered on next and a message is to be displayed on a display of the data processing system.

The policy may also specify that while the state of the data processing system is unpowered, an interior of the data processing system is to be monitored for intrusions, and information regarding any identified intrusions is to be provided to the trusted management system.

The policy may also specify that while the state of the data processing system is powered and the policy is obtained and an intrusion is detected, the data processing system is to be depowered and a power button of the human interface devices is to be disabled.

The policy may also specify that while the state of the data processing system is powered and the policy is obtained but no intrusion is detected, human interface devices of the data processing system are to be disabled and a message is to be displayed on a display of the data processing system.

The data processing system may include a network module adapted to separately advertise network endpoints for the management controller and other hardware resources of the data processing system, the network endpoints being usable by the trusted management system to address communications to the hardware resources and the management controller.

The management controller and the network module may be on separate power domains from the other hardware resources so that the management controller and the network module may be operable while the other hardware resources are inoperable.

The out of band communication channel may run through the network module, and an in band communication channel that services the other hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
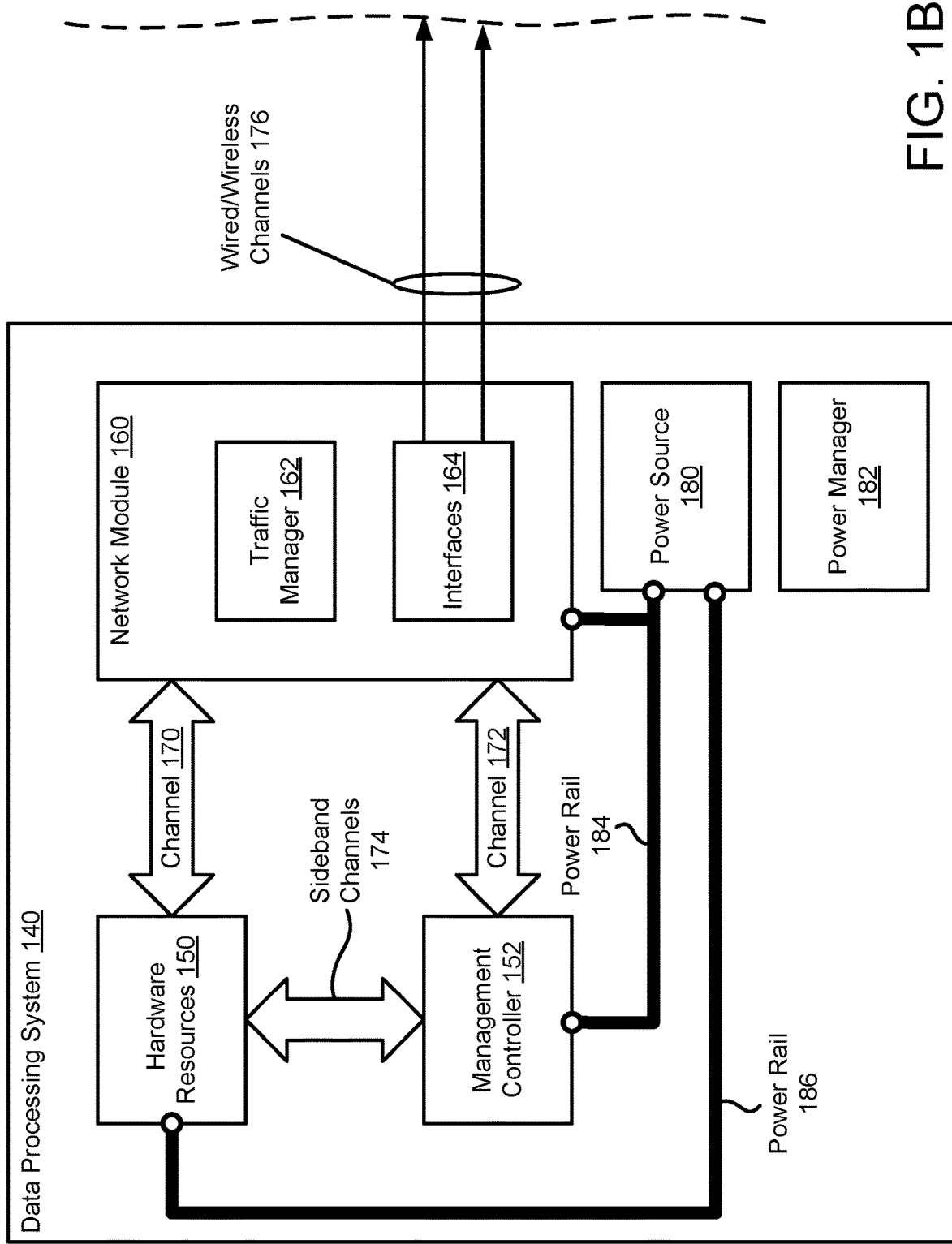
FIG. 1B shows a block diagram illustrating a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, trusted management system 100, data processing systems 102 and/or any other type of devices (not shown in FIG. 1A). Other types of computer-implemented services may be provided by the system shown in FIG. 1A without departing from embodiments disclosed herein.

While providing the aforementioned computer-implemented services (e.g., to owners of data processing systems 102 and/or by the owners of data processing systems 102), data processing systems 102 may be susceptible to loss or theft. A lost or stolen data processing system (e.g., 102A, 102N) may have an increased likelihood of being subject to physical intrusion and/or otherwise unintended use by a user that is not the owner of the data processing system.

Following a report (e.g., by the owner of data processing system 102A) that data processing system 102A is lost or stolen, actions may be performed to discourage unintended use of data processing system 102A by a user other than the owner of data processing system 102A. For example, upon powering up data processing system 102A, data processing system 102A may be notified that a loss or theft has occurred, and instructions may be provided to data processing system 102A to perform actions to prevent a malicious entity from using data processing system 102A (e.g., by disabling HIDs).

However, receipt of the notification of the loss or theft and/or receipt of a policy indicating actions to be performed may not occur until data processing system 102A is powered and may rely on in band components (e.g., an in band communication channel) that may be susceptible to compromise by a malicious entity. Specifically, the malicious entity may: (i) manipulate an in band communication channel so that the notification and/or policy may not be received, (ii) uninstall software hosted by hardware components of data processing system 102A that are usable to interpret and implement the policy, and/or (iii) may perform other actions to prevent responsive actions from being performed.

In general, embodiments disclosed herein relate to systems, devices, and methods for managing policies for data processing systems 102 in the event that one or more data processing systems of data processing systems 102 are lost or stolen. To do so, a management controller of a lost or stolen data processing system (e.g., 102A) may utilize an out of band communication channel to obtain, from a trusted management system, a notification of a loss of theft of data processing system 102A and/or a policy to be implemented in response to the loss or theft.

The management controller and a network module responsible for directing network traffic to the out of band communication channel may be powered separately from hardware resources of data processing system 102A and, therefore, the management controller may perform actions and send and/or receive communications while the hardware resources of data processing system 102A are unpowered.

The policy obtained using the out of band communication channel from the trusted management system may specify actions to be taken based on a state of data processing system 102A. Specifically, the policy may specify that a first action is to be performed if the state of data processing system 102A is unpowered and that a second action is to be performed if the state of data processing system 102A is powered. Further, additional actions may be performed if an intrusion has been detected for data processing system 102A.

Trusted management system 100 may be implemented using a physical device that stores and manages policies. Owners of data processing systems 102 may interact with trusted management system 100 to report a loss or theft of a data processing system (e.g., via one or more graphical user interfaces). Trusted management system 100 may obtain a report of a lost or stolen data processing system of data processing systems 102 and may utilize an out of band communication channel of communication system 106 to provide a policy to the reported data processing system.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and trusted management system 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

Management controller 152 may obtain a policy for data processing system 140 using channel 172 following receipt of a notification that data processing system 140 is lost or stolen. Management controller 152 may obtain the policy and may implement the policy via interactions with hardware resources 150.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information (e.g., a policy in response to a report that data processing system 140 is lost or stolen) from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To provide its functionality, management controller 152 may: (i) obtain a policy from a trusted management system via an out of band communication channel (e.g., 172), (ii) identify a state (e.g., powered or unpowered) of data processing system 140, (iii) select one or more actions based on the policy and the state, and/or (iv) perform the one or more actions to implement the policy.

The policy may be obtained from the trusted management system in response to a report being made (e.g., to the trusted management system) by an owner of data processing system 140 indicating that data processing system 140 is lost or stolen. The policy may specify actions to be taken based on criteria (e.g., whether data processing system 140 is powered, whether an intrusion is detected). Management controller 152 may obtain the policy via an out of band communication channel (e.g., 170) and, therefore, the policy may not be intercepted and/or interfered with by a malicious entity.

The policy may specify, if data processing system 140 is unpowered and the policy is obtained, that HIDs of data processing system 140 are to be disabled after data processing system 140 is powered on next and a message is to be displayed on a display of data processing system 140. In addition, the policy may specify that, while data processing system 140 is unpowered, an interior of data processing system 140 is to be monitored for intrusions and information regarding any intrusions is to be provided to the trusted management system.

The policy may also specify, if data processing system 140 is powered and the policy is obtained and an intrusion is detected, that data processing system 140 is to be depowered and a power button of the HIDs is to be disabled. In addition, the policy may specify that, if data processing system 140 is powered and the policy is obtained but no intrusion is detected, HIDs of data processing system 140 are to be disabled and a message is to be displayed on a display of data processing system 140.

Figure 2:
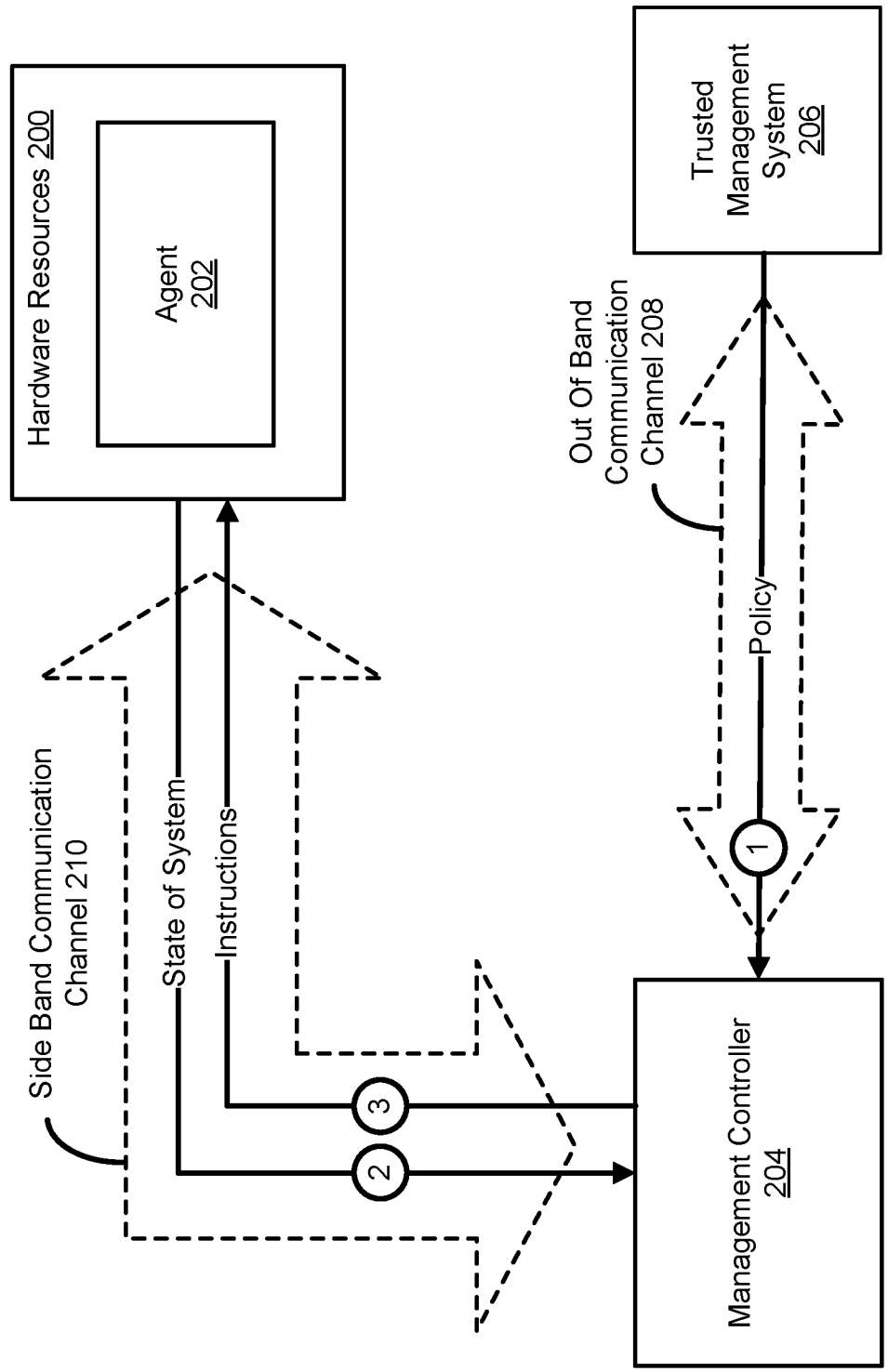
FIG. 2 shows a data flow diagram illustrating a management controller interacting with a trusted management system and hardware resources in accordance with an embodiment.
Figure 3:
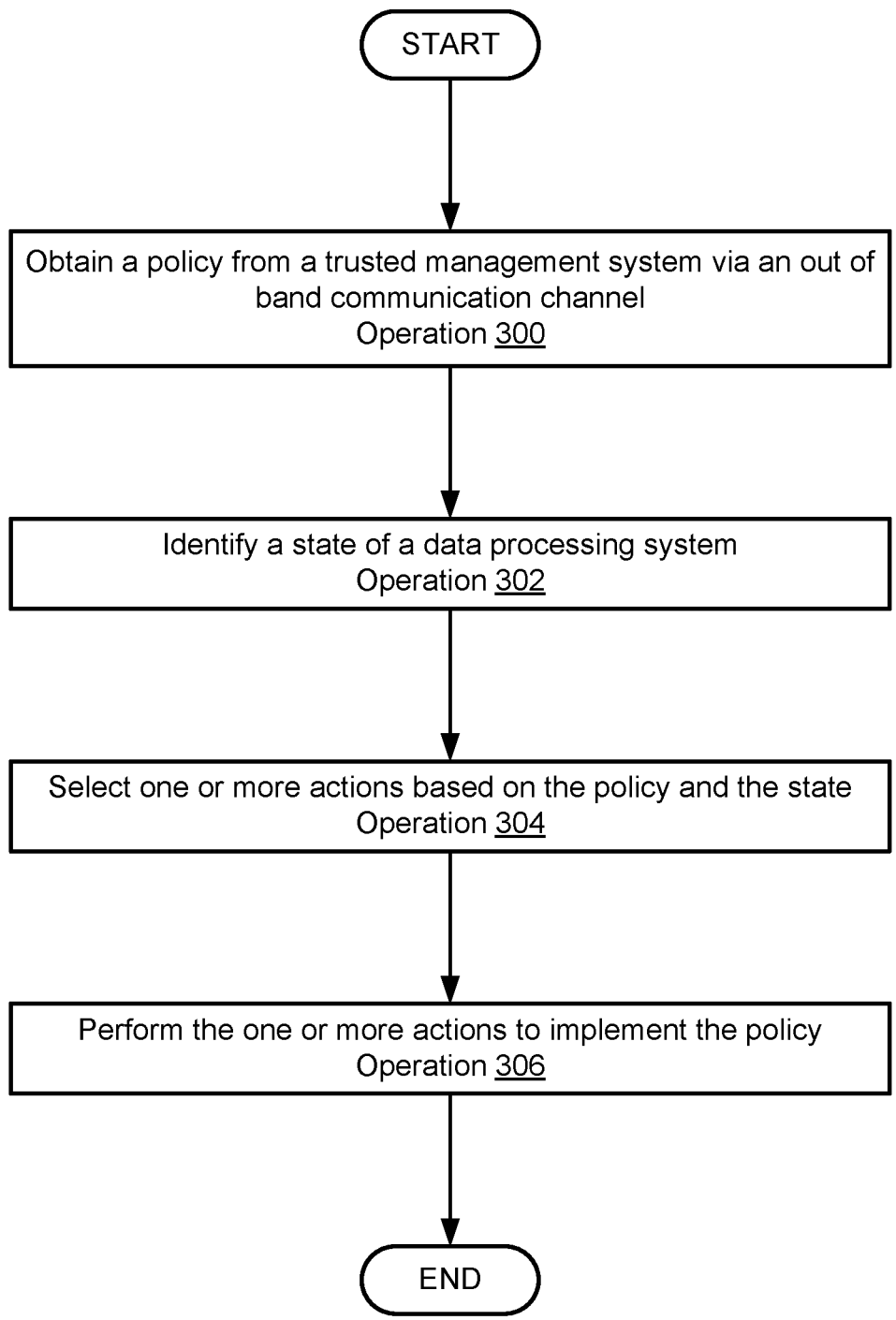
FIG. 3 shows a flow diagram illustrating a method of managing policies for a data processing system in accordance with an embodiment.

When providing its functionality, management controller 152 may perform all, or a portion, of the methods and operations illustrated in FIGS. 2-3.

While illustrated in FIG. 1B with a limited number of specific components, a system may include additional, fewer, and/or different components without departing from embodiments disclosed herein.

As discussed above, the components of FIGS. 1A-1B may perform various methods to manage policies for data processing systems that perform computer-implemented services. FIGS. 2-3 may illustrate examples of methods that may be performed by the components of FIGS. 1A-1B. For example, a management controller similar to management controller 152 may perform all or a portion of the methods. In the diagrams discussed below and shown in FIGS. 2-3, any of the operations may be repeated, performed in different orders, and/or performed in parallel with or in a partially overlapping in time manner with other operations.

FIG. 2 shows a data flow diagram illustrating a management controller interacting with a trusted management system and hardware resources in accordance with an embodiment. The data flow diagram may illustrate management of policies for a data processing system similar to data processing system 140 described in FIG. 1B.

In FIG. 2, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1) management controller 204 may obtain a policy from trusted management system 206 via out of band communication channel 208. Trusted management system 206 may be similar to trusted management system 100 described in FIG. 1A and management controller 204 may be similar to management controller 152 described in FIG. 1B. The policy may be provided to management controller 204 in response to a report being received by trusted management system 206. The report may have been obtained from an owner of a data processing system associated with management controller 204 and hardware resources 200 and may have indicated that the data processing system was lost or stolen.

The policy may be applicable to data processing systems that have been reported by owners of the data processing systems as being lost or stolen. For example, an owner of a data processing system may utilize a customer portal (e.g., a graphical user interface) to interact with trusted management system 206 via a device other than the data processing system. To trust trusted management system 206, the owner may be required to provide one or more authentication factors (e.g., a password, a pin, a biometric factor). The owner may report to trusted management system 206 that the data processing system owned by the owner is lost or stolen. In response to the report, trusted management system 206 may notify the data processing system that it has been reported as lost or stolen and/or may provide the policy to the data processing system.

The policy may include: (i) a notification that the data processing system has been reported lost or stolen, and/or (ii) a list of potential actions to be performed based on the state of the data processing system. The state of the data processing system may be powered or unpowered. The state of the data processing system may, therefore, indicate whether the data processing system is powered on or powered off at the time that management controller 204 receives the policy from trusted management system 206.

As described in FIG. 1B, management controller 204 and a network module that manages communications sent and received via out of band communication channel 208 may be powered by a separate power domain than hardware resources 200. Therefore, if the state of the data processing system is unpowered, management controller 204 may be powered and hardware resources 200 may be unpowered. Similarly, if the state of the data processing system is powered, the management controller may be powered and hardware resources 200 may also be powered. Refer to FIG. 1B for additional details regarding power domains.

All communications between trusted management system 206 and management controller 204 may utilize out of band communication channel 208. Consequently, a malicious entity may not prevent management controller 204 from receiving the policy via compromise of one or more in band components of the data processing system.

To determine which actions specified by the policy should be implemented to prevent undesired use of the data processing system, management controller 204 may identify the state of the system (e.g., powered or unpowered) and/or may read other information from storage regarding components of the data processing system. The state of the system may be obtained via an interaction with hardware resources 200 over side band communication channel 210 (as shown at time point two (2) in in FIG. 2) and/or may be obtained from other components and/or entities without departing from embodiments disclosed herein. Side band communication channel may be similar to any of sideband channels 174 described in FIG. 1B.

In a first example, the state of the system may indicate that hardware resources 200 are unpowered when the policy is obtained. If hardware resources 200 are unpowered, the policy may specify that HIDs of the data processing system are to be disabled and a message is to be displayed on a display of the data processing system. The policy may also specify that the interior of the data processing system is to be monitored for intrusions and information regarding any identified intrusions is to be provided to trusted management system 206.

In a second example, the state of the system may indicate that hardware resources 200 are powered when the policy is obtained. If hardware resources 200 are powered, the policy may specify that, if an intrusion is detected, hardware resources 200 are to be depowered and a power button of the HIDs is to be disabled. The policy may also specify that if hardware resources 200 are powered but no intrusion is detected, HIDs of the data processing system are to be disabled and a message is to be displayed on a display of the data processing system.

Management controller 204 may, therefore, select one or more actions to be performed from the policy based on the state of the system when the policy was obtained and/or whether any intrusions are detected. At time point three (3), management controller 204 may provide instructions to hardware resources 200 and/or agent 202 hosted by hardware resources 200 via side band communication channel 210 based on the selected actions.

Continuing with the first example, the instructions may directly and/or indirectly disable HIDs of the data processing system (e.g., a power button, a keyboard, a mouse) and may specify information to display in the message on the display of the data processing system. The message may include, for example, an indication that the data processing system is a lost or stolen data processing system. The message may be displayed for duration of time defined by the policy (e.g., fifteen minutes) in order to provide time for the user of the data processing system that is not the owner of the data processing system to comprehend that the data processing system is currently unusable. After the duration of time passes, hardware resources 200 may be depowered.

The instructions may also directly and/or indirectly activate any number of sensors positioned to generate an intrusion alert if any physical intrusions occur (e.g., removal of one or more parts of the data processing system). Specifically, an intrusion alert may occur if the data processing system is a laptop and a user opens the laptop. The intrusion alert may be provided to trusted management system 206 (not shown) and a message on the laptop screen may indicate that the laptop has been stolen. The power button may then be disabled for the laptop and, therefore, the data processing system may not be able to be re-powered.

Continuing with the second example, if an intrusion is detected, the instructions may directly and/or indirectly instruct hardware resources 200 to power off and to disable a power button of the HIDs. The instructions may also specify that, if an intrusion is not detected, other HIDs of the data processing system (e.g., a keyboard, a mouse) are to be disabled. The instructions may also include information to be included in the message on the display of the data processing system. The message may include, for example, an indication that the data processing system is a lost or stolen data processing system. The message may be displayed for a duration of time defined by the policy (e.g., fifteen minutes) in order to provide time for the user of the data processing system that is not the owner of the data processing system to comprehend that the data processing system is currently unusable. After the duration of time passes, hardware resources 200 may be depowered and the power button may be disabled.

By doing so, management controller 204 may perform actions to prevent unintended use of data processing systems when they are reported as lost or stolen. By providing instructions to a management controller via an out of band communication channel, actions may be taken to disable features of the data processing system while the data processing system is unpowered. Therefore, a malicious entity may be discouraged from attempting to use the data processing system.

In an embodiment, the one or more entities performing the operations shown in FIG. 2 are implemented using a processor adapted to execute computing code stored on a persistent storage that when executed by the processor performs the functionality of the system of FIGS. 1A-1B discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1A may perform various methods to manage data processing systems. FIG. 3 illustrates methods that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing policies for a data processing system in accordance with an embodiment is shown. The method may be performed, for example, by a management controller, and/or any other entity.

At operation 300, a policy may be obtained from a trusted management system via an out of band communication channel. Obtaining the policy may include: (i) receiving a message from the trusted management system, the message being transmitted using the out of band communication channel to a network endpoint associated with the data processing system, (ii) extracting a payload from the message, (iii) reading the payload to obtain the policy, and/or (iv) other methods.

Obtaining the policy via the out of band communication channel may also include receiving the policy in the form of a message from an entity other than the trusted management system, the entity having previously obtained the policy from the trusted management system and the entity also being trusted by the trusted management system and the data processing system.

At operation 302, a state of the data processing system may be identified. Identifying the state of the system may include determining whether the data processing system is powered or unpowered. Identifying the state of the data processing system may include: (i) reading the state of the data processing system from storage, (ii) receiving a notification from another entity, the notification indicating the state of the data processing system, and/or (iii) other methods.

At operation 304, one or more actions may be selected based on the policy and the state. Selecting the one or more actions may include: (i) comparing the state of the data processing system to the policy to identify the one or actions listed in the policy that correspond to the identified state of the system, (ii) providing the state and the policy to another entity responsible for selecting the one or more actions, and/or (iii) other methods.

For example, the policy may indicate a first action set to be performed if the state of the data processing system is unpowered and a second action set to be performed if the state of the data processing system is powered. The state of the data processing system may be matched to one of the previously mentioned states of the data processing system, and the corresponding action set may be selected for implementation.

At operation 306, the one or more actions may be performed to implement the policy. Performing the one or more actions may include: (i) directly modifying operation of the data processing system, (ii) providing instructions to an entity (e.g., a software agent hosted by the hardware resources, another data processing system), the instructions indicating the one or more actions to be performed, and/or (iii) other methods.

Directly modifying operation of the data processing system may include: (i) disabling one or more HIDs of the data processing system by re-programming a chip of the hardware resources to no longer receive user input, (ii) depowering the data processing system, (iii) initiating display of a message on a display of the data processing system, (iv) adding and/or removing software instructions from storage, and/or (v) other methods. Refer to FIG. 2 for additional details regarding actions included in the policy.

The method may end following operation 306.

Figure 4:
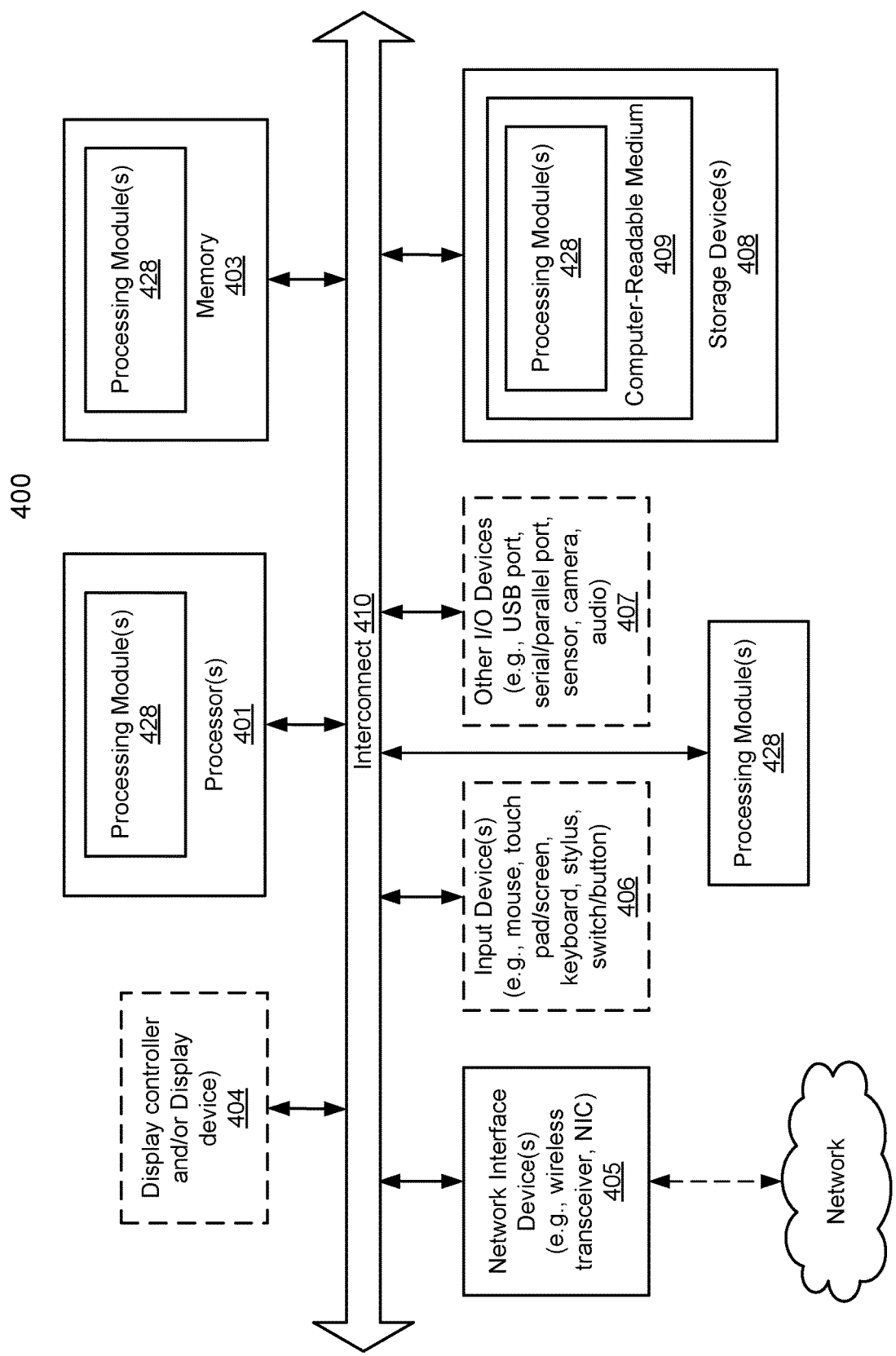
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
    obtaining, by a management controller of a data processing system of the data processing systems and via an out of band communication channel, a policy from a trusted management system;
    identifying, by the management controller, a state of the data processing system;
    selecting, by the management controller, one or more actions based on the policy and the state, the policy specifying, at least, that:
        while the state of the data processing system is unpowered and the policy is obtained, human interface devices of the data processing system are to be disabled after the data processing system is powered on next, and
        while the state of the data processing system is powered and the policy is obtained and an intrusion is detected, the data processing system is to be depowered and a power button of any of the human interface devices is to be disabled; and
    performing, by the management controller, the one or more actions to implement the policy.

2. The method of claim 1, wherein the policy is applicable to data processing systems that have been reported by owners of the data processing systems as being lost or stolen.

3. The method of claim 1, wherein the state of the data processing system is powered or unpowered.

4. The method of claim 3, wherein while the state of the data processing system is unpowered, the management controller is powered and other hardware resources of the data processing system are unpowered.

5. The method of claim 4, wherein while the state of the data processing system is powered, the management controller is powered and the other hardware resources of the data processing system are powered.

6. The method of claim 1, wherein a message is further to be displayed on a display of the data processing system after the data processing system is powered on next.

7. The method of claim 6, wherein the policy further specifies that while the state of the data processing system is unpowered, an interior of the data processing system is to be monitored for intrusions, and information regarding any identified intrusions is to be provided to the trusted management system.

8. The method of claim 1, wherein the policy further specifies that while the state of the data processing system is powered and the policy is obtained but no intrusion is detected, human interface devices of the data processing system are to be disabled and a message is to be displayed on a display of the data processing system.

9. The method of claim 1, wherein the data processing system comprises a network module adapted to separately advertise network endpoints for the management controller and other hardware resources of the data processing system, the network endpoints being usable by the trusted management system to address communications to the other hardware resources and the management controller.

10. The method of claim 9, wherein the management controller and the network module are on separate power domains from the other hardware resources so that the management controller and the network module are operable while the other hardware resources are inoperable.

11. The method of claim 9, wherein the out of band communication channel runs through the network module, and an in band communication channel that services the other hardware resources also runs through the network module.

12. The method of claim 9, wherein the management controller hosts a transmission control protocol/internet protocol (TCP/IP) stack to facilitate network communications via the out of band communication channel.

13. A non-transitory machine-readable medium having instructions stored therein, which when executed by a processor, cause the processor to perform operations for managing data processing systems, the operations comprising:
    obtaining, by a management controller of a data processing system of the data processing systems and via an out of band communication channel, a policy from a trusted management system;
    identifying, by the management controller, a state of the data processing system;
    selecting, by the management controller, one or more actions based on the policy and the state, the policy specifying, at least, that:
        while the state of the data processing system is unpowered and the policy is obtained, human interface devices of the data processing system are to be disabled after the data processing system is powered on next, and while the state of the data processing system is powered and the policy is obtained and an intrusion is detected, the data processing system is to be depowered and a power button of any of the human interface devices is to be disabled; and performing, by the management controller, the one or more actions to implement the policy.

14. The non-transitory machine-readable medium of claim 13, wherein the policy is applicable to data processing systems that have been reported by owners of the data processing systems as being lost or stolen.

15. The non-transitory machine-readable medium of claim 13, wherein the state of the data processing system is powered or unpowered.

16. The non-transitory machine-readable medium of claim 15, wherein while the state of the data processing system is unpowered, the management controller is powered and other hardware resources of the data processing system are unpowered.

17. A data processing system, comprising:
a processor; and
a memory coupled to the processor to store instructions, which when executed by the processor, cause the processor to perform operations for managing data processing systems, the operations comprising:
obtaining, by a management controller of a data processing system of the data processing systems and via an out of band communication channel, a policy from a trusted management system;
identifying, by the management controller, a state of the data processing system;
selecting, by the management controller, one or more actions based on the policy and the state, the policy specifying, at least, that:
while the state of the data processing system is unpowered and the policy is obtained, human interface devices of the data processing system are to be disabled after the data processing system is powered on next, and
while the state of the data processing system is powered and the policy is obtained and an intrusion is detected, the data processing system is to be depowered and a power button of any of the human interface devices is to be disabled; and
performing, by the management controller, the one or more actions to implement the policy.

18. The data processing system of claim 17, wherein the policy is applicable to data processing systems that have been reported by owners of the data processing systems as being lost or stolen.

19. The data processing system of claim 17, wherein the state of the data processing system is powered or unpowered.

20. The non-transitory machine-readable medium of claim 16, wherein while the state of the data processing system is powered, the management controller is powered and the other hardware resources of the data processing system are powered.

\* \* \* \* \*